No. 726,677. PATENTED APR. 28, 1903.
I. B. HAGAN.
MEASURING INSTRUMENT.
APPLICATION FILED SEPT. 19, 1902.
NO MODEL.
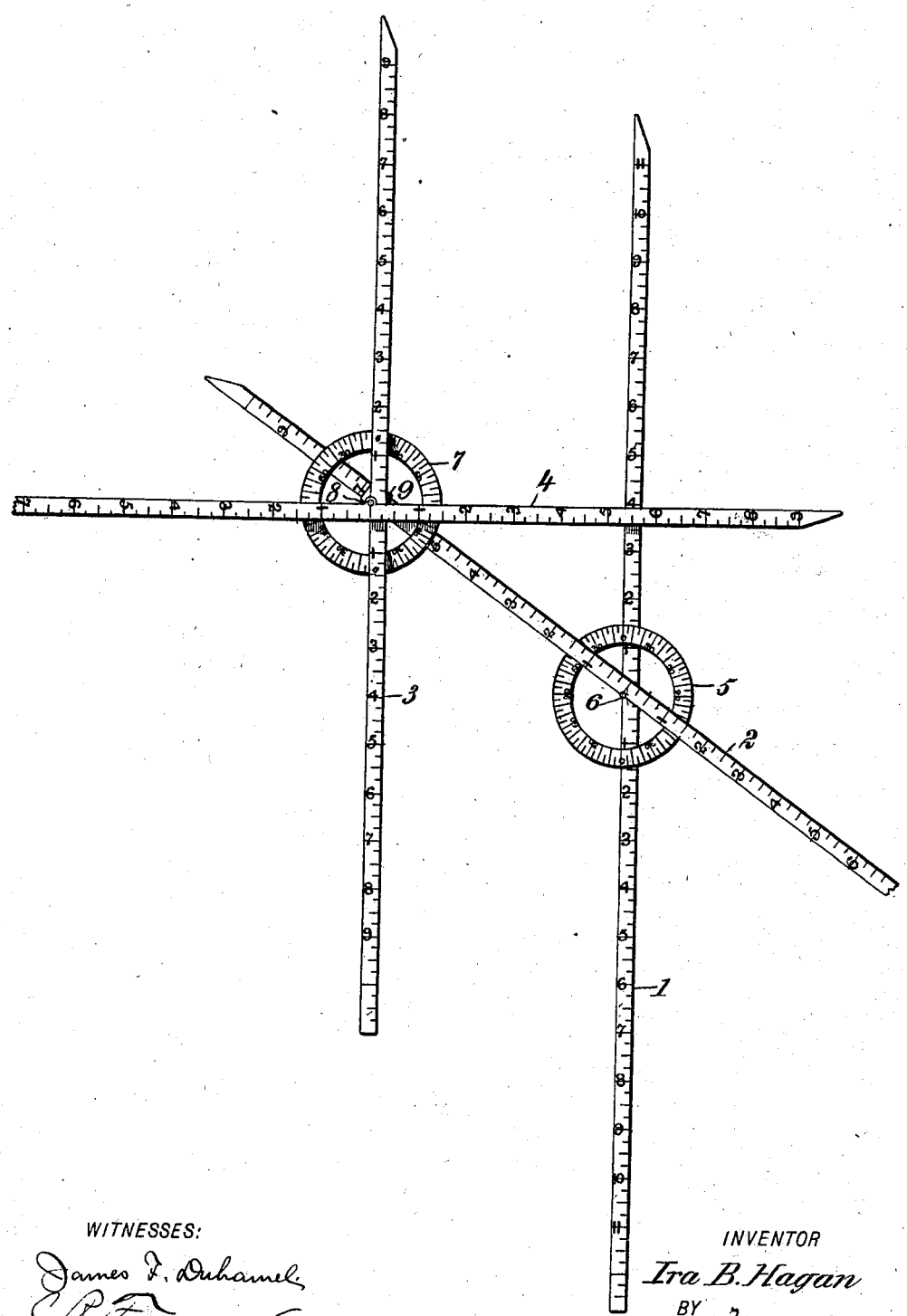
WITNESSES:
James F. Duhamel
E. R. Ferguson
INVENTOR
Ira B. Hagan
BY
ATTORNEYS.

UNITED STATES PATENT OFFICE.

IRA B. HAGAN, OF NORTH LAMOINE, MAINE.

MEASURING INSTRUMENT.

SPECIFICATION forming part of Letters Patent No. 726,677, dated April 28, 1903.

Application filed September 19, 1902. Serial No. 124,006. (No model.)

*To all whom it may concern:*

Be it known that I, IRA B. HAGAN, a citizen of the United States, and a resident of North Lamoine, in the county of Hancock and State of Maine, have invented a new and Improved Measuring Instrument, of which the following is a full, clear, and exact description.

This invention relates to improvements in measuring instruments, the object being to provide a simple and inexpensive instrument that will be found useful to surveyors, engineers, or others in laying out or plotting angles, measuring distances, and plotting work generally.

I will describe a measuring instrument embodying my invention and then point out the novel features in the appended claims.

Reference is to be had to the accompanying drawing, forming a part of this specification, in which the figure is a plan view of a measuring instrument embodying my invention.

The instrument comprises a base-line rule 1, a base-rule 2, a parallel rule 3, and an angle-rule 4. These several rules are marked with an inch or other scale, the scale being carried from the center outward in both directions.

Secured to the rule 1 is a ring 5, on which a degree-scale is marked, and the rule 2 is pivotally connected to the rule 1 at the center of the ring 5, as indicated at 6. A similar scale-ring 7 is attached to the parallel rule 3, and the angle-rule 4 is pivotally connected to the rule 3 at the center of the ring 7, as indicated at 8. Mounted to swing on the pivot 8 or relatively to the rule 3 is a sleeve 9, through which the rule 2 is adapted to slide.

This instrument will be very useful for carpenters, builders, and navigators, as well as for surveyors and engineers, for whom I designed it.

To find the course or bearing and distance between two objects by sea or to lay out timber for building purposes—say rafters—turn base-rule 2 to ninety degrees with the base-line 1, and then they are at right angles. Now the distance by sea or land is equal to the hypotenuse of a right-angle triangle whose northern or southern is one arm or leg and whose eastern or western is the other leg, and the bearing course or angle is shown where the angle-rule passes the circle. To cut a rafter, remove the angle-rule. The length of the rafter or brace is equal to the hypotenuse of a right-angle triangle whose base is half the width of the building and whose perpendicular is height or pitch of roof. This shows the rafter in its place and also the bevels for cutting each end. For a brace, lay off one run on the base end and the other on the perpendicular. The hypotenuse of this triangle shows the brace.

Having thus described my invention, I claim as new and desire to secure by Letters Patent—

1. In a measuring instrument, a base-line rule, a graduated ring secured thereto, a base-rule pivoted to the base-line rule, a parallel rule having sliding connection with the base-rule, a graduated ring secured to the parallel rule, and an angle-rule pivoted to the parallel rule, each of said rules being graduated progressively from the center outward in both directions.

2. A measuring instrument comprising a base-line rule, graduated from its center outward in both directions, a graduated ring secured to said rule, a base-rule graduated from its center outward in both directions and pivoted to the first-named rule at the center of the ring, a parallel rule graduated from its center outward in both directions and having sliding connection with the base-rule, a graduated ring secured to said parallel rule, and an angle-rule pivoted to the parallel rule at the center of the ring and graduated from its center outward in both directions.

3. A measuring instrument comprising a plurality of rules, each graduated progressively from its center outward in both directions, the said rules being pivotally connected in pairs, one pair being slidable on a rule of the other pair, and graduated rings supported by each pair.

In testimony whereof I have signed my name to this specification in the presence of two subscribing witnesses.

IRA B. HAGAN.

Witnesses:
EDMOND J. WALSH,
H. F. WESCOTT.